(12) United States Patent
Kawachi

(10) Patent No.: US 7,328,641 B2
(45) Date of Patent: Feb. 12, 2008

(54) METHOD AND APPARATUS FOR CUTTING GLASS MATERIAL

(75) Inventor: Fumio Kawachi, Gifu (JP)

(73) Assignee: Nihon Taisanbin Kogyo Kabushiki Kaisha, Gifu (JP)

( * ) Notice: Subject to any disclaimer, the term of this patent is extended or adjusted under 35 U.S.C. 154(b) by 0 days.

(21) Appl. No.: 11/107,746

(22) Filed: Apr. 18, 2005

(65) Prior Publication Data

US 2006/0230891 A1    Oct. 19, 2006

(51) Int. Cl.
*B26D 5/16* (2006.01)

(52) U.S. Cl. .......................... 83/597; 83/602; 65/133; 65/174; 65/332

(58) Field of Classification Search .................. 83/38, 83/599, 598, 600, 602, 623, 628, 597; 65/133, 65/174, 332, 334, 324

See application file for complete search history.

(56) References Cited

U.S. PATENT DOCUMENTS

| | | | |
|---|---|---|---|
| 1,362,785 A | 12/1920 | Ferngren | |
| 1,379,594 A | 5/1921 | Peiler | |
| 1,547,147 A * | 7/1925 | Peiler | 65/325 |
| 1,576,734 A * | 3/1926 | Ferngren | 65/332 |
| 2,143,096 A | 1/1939 | Wadsworth | |
| 2,166,563 A * | 7/1939 | Wadsworth | 65/122 |
| 2,269,553 A * | 1/1942 | Roessler | 65/75 |
| 4,015,967 A * | 4/1977 | Ward, Jr. | 65/133 |
| 4,961,773 A | 10/1990 | Takahara et al. | |
| 5,236,489 A * | 8/1993 | Brancati et al. | 65/159 |
| 5,518,515 A | 5/1996 | Blaskowitz et al. | |
| 6,289,696 B1 | 9/2001 | Bogert et al. | |

FOREIGN PATENT DOCUMENTS

| | | |
|---|---|---|
| DE | 41 32 098 C1 | 10/1990 |
| DE | 43 16 842 C1 | 5/1992 |
| EP | 0 546 216 A1 | 6/1993 |
| JP | 62-030629 A | 2/1987 |
| JP | H04-66818 | 10/1992 |
| WO | WO-94/01371 A1 | 1/1994 |
| WO | WO-96/02472 A1 | 2/1996 |

OTHER PUBLICATIONS

European Search Report mailed on May 3, 2005.

* cited by examiner

*Primary Examiner*—Boyer D. Ashley
*Assistant Examiner*—Omar Flores-sanchez
(74) *Attorney, Agent, or Firm*—Cheng Law Group PLLC

(57) ABSTRACT

To provide a method for cutting a glass material wherein the glass material can be certainly cut a glass gob having a uniform quality and a uniform temperature distribution, without being deformed or damaged. Upon cutting a glass material 20 discharged from a glass material reservoir 10 into a glass gob 21 at a predetermined size by left and right cutting blades 91, 92 which come close to or away from each other in a horizontal direction, said cutting blades 91, 92 are opposed to the other and are translated in such a way that the movement occurs in a forward direction from stand-by positions P, P1 and in a downward direction (S1) to cut the glass material (C), and thereafter, in a further downward direction and in a rearward direction (S2), and thereafter, in an upward direction to return back to said stand-by positions (S3).

1 Claim, 4 Drawing Sheets

A

B

C

METHOD AND APPARATUS FOR CUTTING GLASS MATERIAL

BACKGROUND OF THE INVENTION

1. Field of the Invention

This invention relates to a method and an apparatus for cutting a glass material.

2. Related Background Art

A glass material melted in a furnace is adjusted in temperature to a value necessary to form a desired glass product, is transferred to and discharged from a glass material reservoir called a spout, is cut into a mass of glass (gob) having a predetermined size, and is supplied to a forming apparatus. To cut the glass material to a predetermined size, a cutting apparatus, having a cutter blade, is provided beneath an orifice provided in the lower portion of the spout.

In a conventional glass material cutting apparatus used in a glass forming apparatus such as a bottle manufacturing apparatus or the like, arms provided with left and right cutting blades are opposed to each other and are moved along arc-shaped tracks or linear tracks to come close to or away from one another in order to cut the glass material (see, e.g., Japanese Kohyo No. 10-511633 and, in particular, pages 4 and 5, FIGS. 1 and 2 thereof). However, to satisfy a current need for a high-speed manufacturing, the temperature of the glass material is increased to thereby reduce the viscosity so that the cutting blades can be moved at a high-speed. However, due to this solution to enhance the productivity, the following problems have been raised.

For example, in a cutting apparatus in which arms having cutting blades are opened and closed by an arcwise movement (this type of apparatus is currently most popular), if an opening and closing cycle of the arm is shortened, the cutting blades provided on the arms cannot be completely closed so that the glass material fails to be cut completely, and therefore, stringing of the glass gob or interconnection of glass gobs like a string of sausages occurs.

In a cutting apparatus in which the cutting blades of the arms are opened and closed by an arcwise movement, the distal portions of the cutting blades close to the pivotal fulcrums of the opening and closing arms come into contact with the glass material earlier and separate therefrom later. On the other hand, the proximal portions of the cutting blades distant from the fulcrums of the opening and closing arms come into contact with the glass material later and separate therefrom earlier. This causes a difference in the temperature or instability of the shape of cutting surface portions of the glass material in contact with the cutting blades, due to a difference in the contact time of the cutting blades. This tendency is particularly remarkable in a cutting apparatus in which a plurality of cutting blades are provided in the axial direction of the arms, and thus resulting in unstable quality of the glass gobs.

Furthermore, in any type of cutting apparatus in which the cutting blades are opened and closed with respect to a glass material by an arcwise movement or translation, if the temperature is increased to reduce the viscosity of the glass material in order to respond to a need for a high-speed manufacturing, a so-called "banana shaped gob phenomenon" in which a soft glass material having a low viscosity rides on the upper surfaces of the cutting blades and is moved together therewith and is bent in the same direction as the movement of the cutting blades tends to occur when the glass material is cut. If this phenomenon occurs, the glass material tends to be minutely damaged at its lower portion or to have a non-uniform temperature distribution, thus leading to deterioration of the quality of the product.

SUMMARY OF THE INVENTION

This invention has been completed to eliminate the drawbacks mentioned above and is aimed at provision of a method for cutting a glass material wherein the glass material can be certainly cut into a glass gob having a uniform quality and a uniform temperature distribution without the gob being deformed or damaged. Another object of the present invention is to provide a cutting apparatus having high durability in which a glass material can be cut at high-speed and economically.

In claim 1, there is provided a method for cutting a glass material, discharged from a glass material reservoir into a glass gob of a predetermined size, using left and right cutting blades which are moved close to and away from each other in a horizontal direction, wherein said cutting blades are opposed to the other and are translated in such a way that the movement occurs in a forward direction from stand-by positions and in a downward direction to cut the glass material, and thereafter, in a further downward direction and in a rearward direction, and thereafter, in an upward direction to return back to said stand-by positions.

In claim 2, there is provided a glass material cutting apparatus for cutting a glass material discharged from a glass material reservoir into a glass gob of a predetermined size by left and right cutting blades opposed to each other, comprising a horizontal movement mechanism (H) for translating said cutting blades close to or away from each other in a horizontal direction, and an upward and downward movement mechanism (V) for moving said horizontal movement mechanism in an upward and downward direction, said cutting blades being moved in a forward direction from respective stand-by positions and in a downward direction to cut the glass material, and thereafter, in a further downward direction and in a backward direction, and thereafter, in an upward direction to return back to said stand-by positions.

In claim 3, there is provided a glass material cutting apparatus according to claim 2, wherein said horizontal movement mechanism and said upward and downward movement mechanism are driven by a single driving portion.

In claim 4, there is provided a glass material cutting apparatus according to claim 3 comprising a single driving portion (52) mounted on a base plate (51), left and right operating members (55, 56) which are rotatable by said driving portion, left and right cam members (61, 62) which are rotatable together with said operating members and which have first cam portions (65, 66) and second cam portions (67, 68), respectively, an elevator member (70) which has first engagement portions (71, 72) which are engaged with the first cam portions of said cam members and which are moved up and down along a vertical rail (59) provided on said base plate, in accordance with a rotation of said cam members, left and right supporting members (81, 82) which have second engagement portions (83, 84) which are engaged with the second cam portions of said cam members and which are moved laterally close to or away from each other along a lateral rail (77) provided on said elevator member, in accordance with a rotation of said cam members, and left and right cutting blades (91, 92) which are provided on said supporting members and are opposed to each other.

DESCRIPTION OF THE PREFERRED EMBODIMENTS

Figure 1:
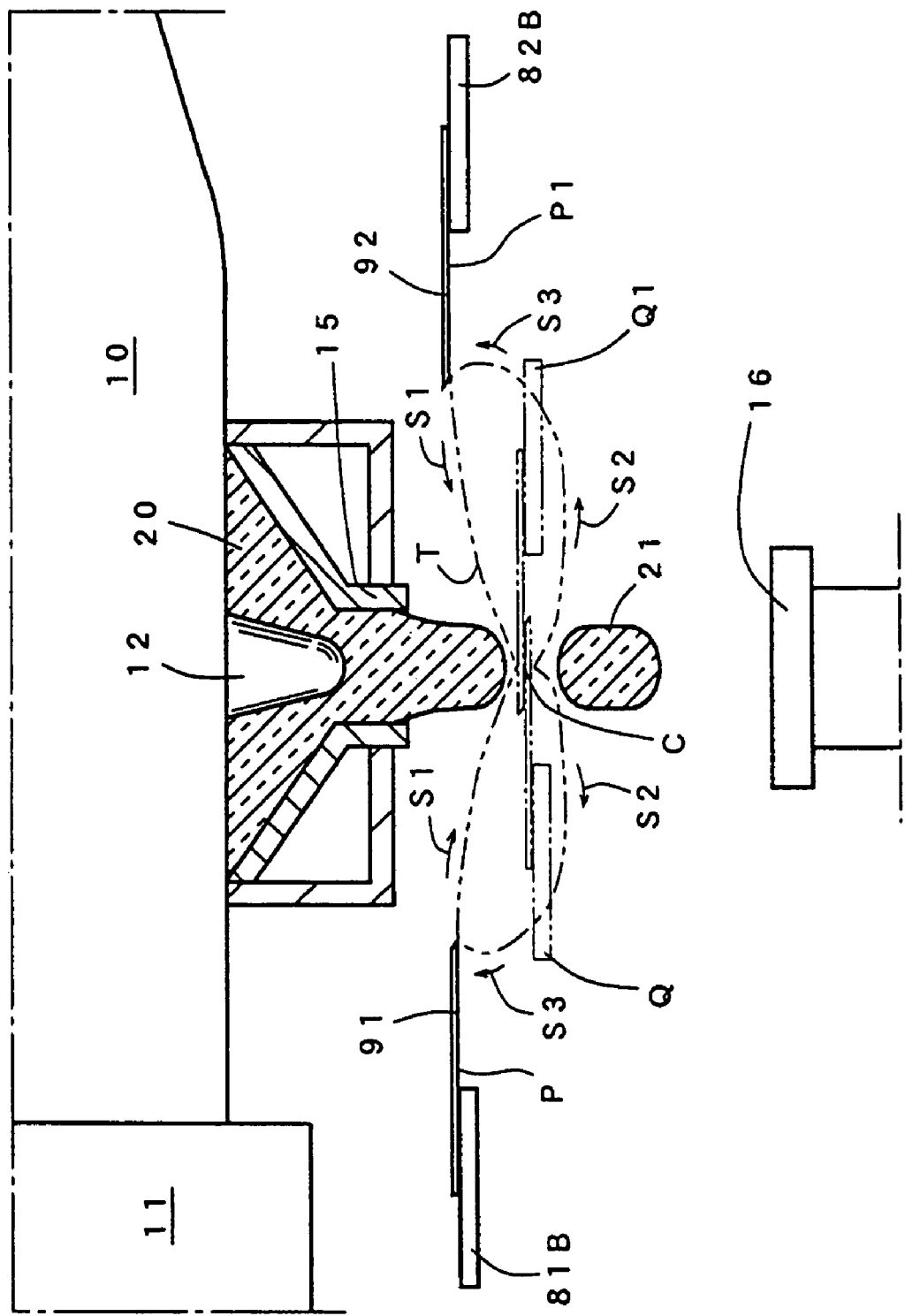
FIG. 1 is a schematic sectional view of an example of a glass material cutting method of the invention.
Figure 2:
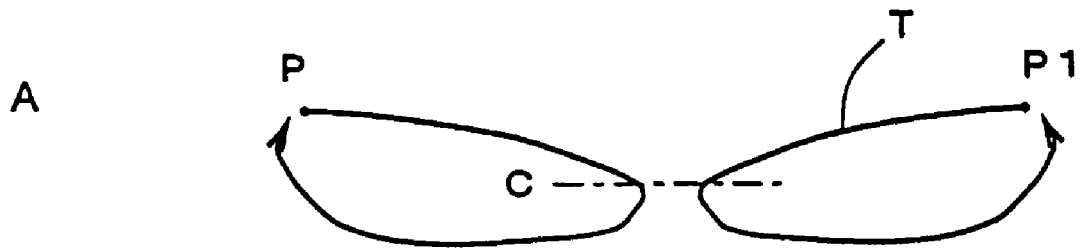
FIG. 2, consisting of FIGS. 2A to 2C, shows movement tracks of cutting blades.
Figure 2:
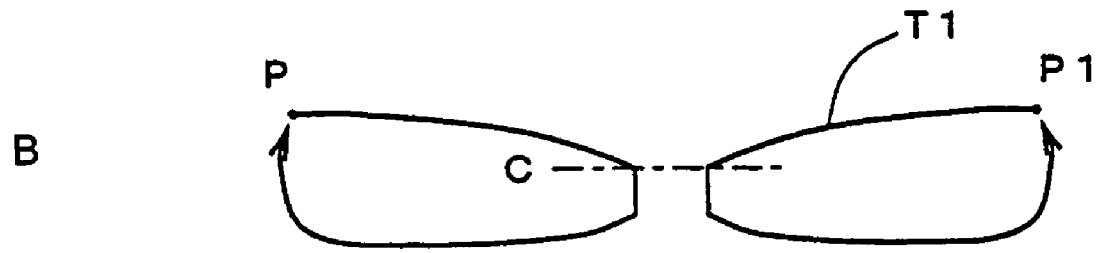
Figure 2:
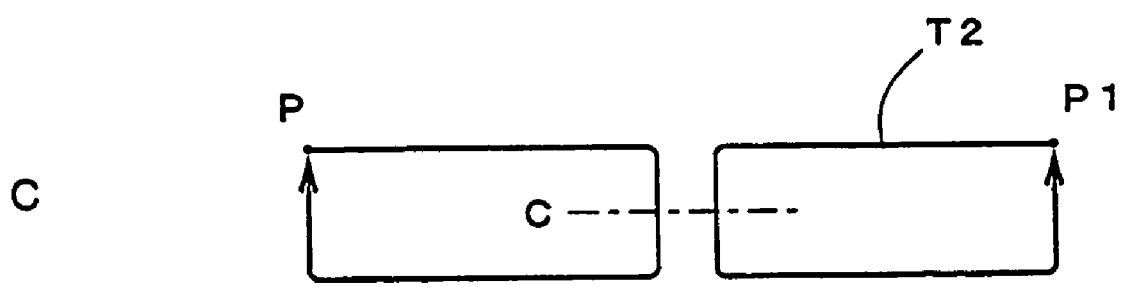
Figure 3:
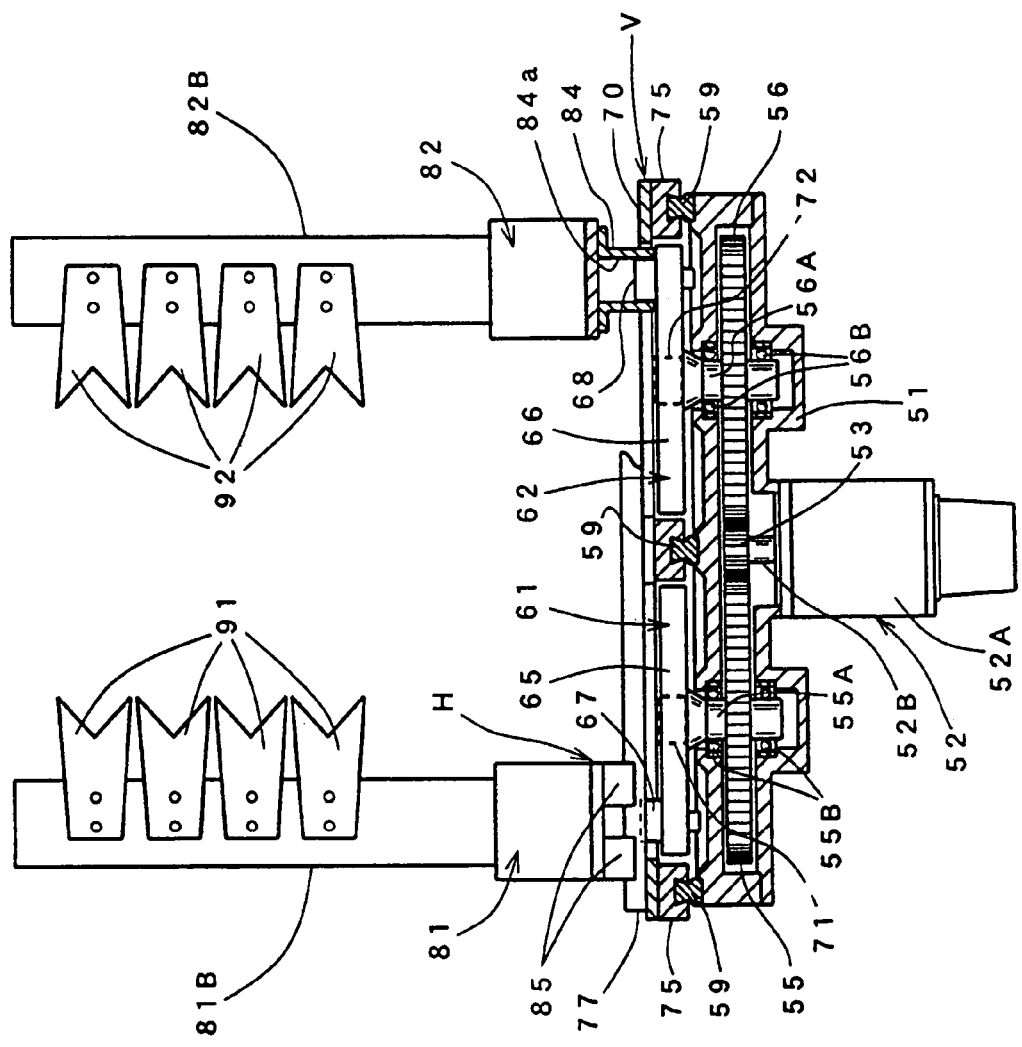
FIG. 3 is a partially omitted sectional view of an example of a cutting apparatus to perform a method shown in FIG. 1.
Figure 4:
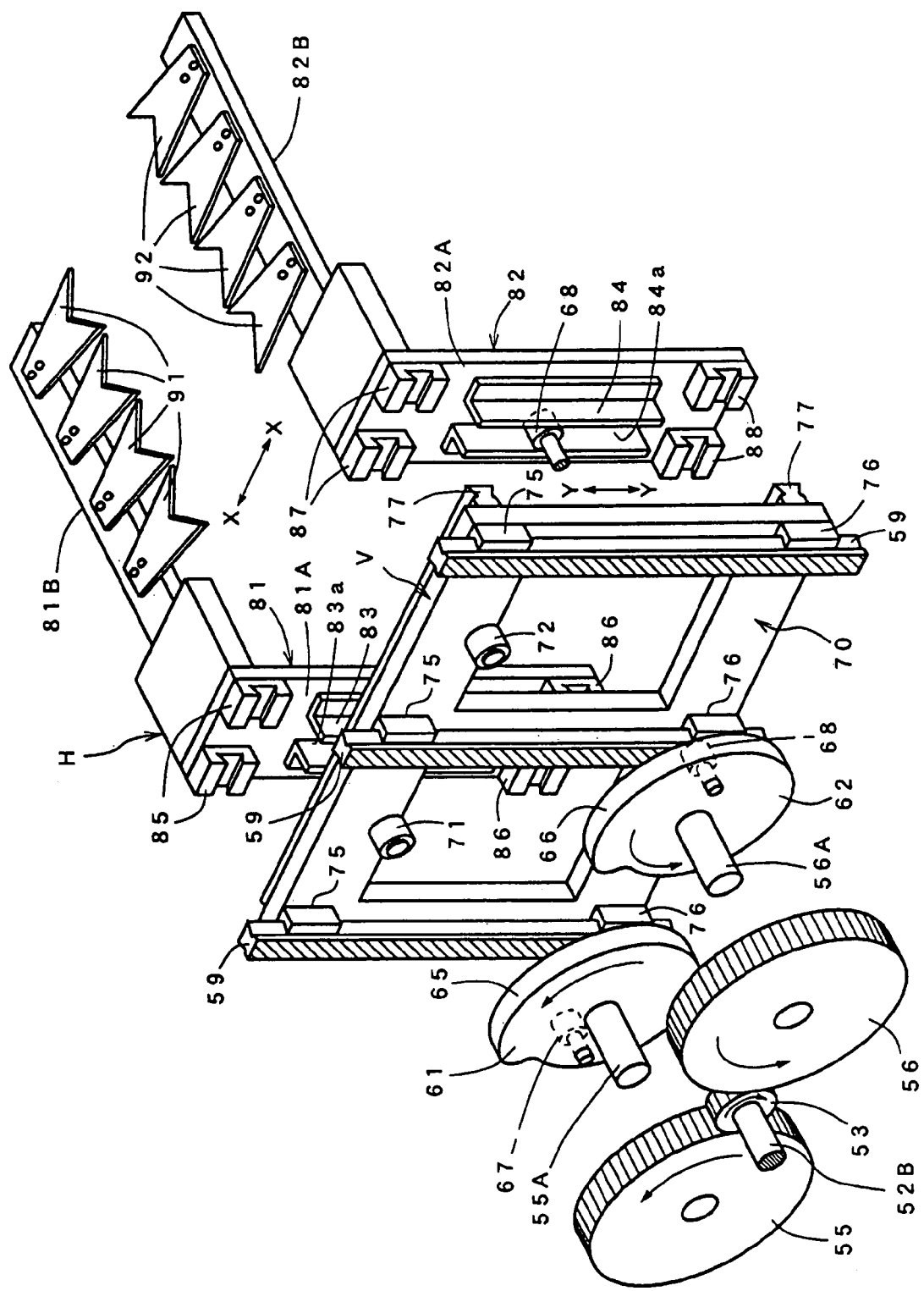
FIG. 4 is an exploded perspective view of a main portion of a cutting apparatus shown in FIG. 3.

Embodiments of the invention will be discussed below referring to the drawings. FIG. 1 is a schematic sectional view of an example of a glass material cutting method of the invention. FIG. 2 shows movement tracks of cutting blades. FIG. 3 is a partially omitted sectional view of an example of a cutting apparatus to perform a method shown in FIG. 1. FIG. 4 is an exploded perspective view of a main portion of a cutting apparatus shown in FIG. 3.

As shown in FIG. 1, a method for a cutting glass material described in claim 1 is related to a method for cutting a glass material 20 discharged from a glass material reservoir 10 into a glass gob 21 of a predetermined size by left and right cutting blades 91 and 92 which are moved close to or away from each other in a horizontal direction. In FIG. 1, numeral 11 designates a glass dissolving furnace which is connected to the glass material reservoir 10; 12 a plunger which moves the glass material out of the glass material reservoir 10; 15 an orifice through which a predetermined amount of glass material is discharged and which is replaceably mounted to the lower portion of the glass material reservoir 10; 16 a guide portion which guides the cut glass gob 21 to a forming die or the like; and 81B and 82B the arm portions on which the left and right cutting blades 91 and 92 are mounted, respectively.

In the method of the present invention, as can be seen in FIG. 1, in which the tracks of movement of the left and right cutting blades 91 and 92 are indicated at "T", the left and right cutting blades 91 and 92 are moved forward from respective stand-by positions (retracted positions) P, P1, are moved downward (S1), to cut the glass material 20 as indicated at (C). Thereafter, the left and right cutting blades 91 and 92 are further moved downward, are moved backward (S2), and thereafter, are moved upward to be returned back to the stand-by positions P and P1 (S3).

At the cutting positions Q, Q1 of the cutting blades, indicated by dotted lines, the glass material 20 is cut (C). The cutting blades 91 and 92, which are moved close to or away from one another in the horizontal direction with respect to the glass material 20 discharged from the orifice 15 of the glass material reservoir 10 are simultaneously brought into contact with the glass material 20 and it is possible to prevent the glass material from riding on the upper surfaces of the cutting blades 91 and 92 and moving together therewith because, as shown in the drawings, the left cutting blades 91 and the right cutting blades 92 are moved forward and downward (S1) to cut the glass material 20 (C), and are thereafter, moved downward and backward (S2). Consequently, a difference of temperature or instability of shapes of the glass gobs, which have been mentioned above in connection with the prior art, occur. Moreover, a banana gob phenomenon in which the glass material 20 rides on the cutting blades 91 and 92 and is bent in the direction of the movement of the cutting blades does not take place.

Gobs in uniform and desired quality of glass gobs can be stably obtained even from a glass material having a high temperature and low viscosity.

FIGS. 2A–2C show different examples of the movement tracks of the cutting blades 91, 92. FIG. 2A shows the track "T" in the embodiment shown in FIG. 1. In an example of the track "T1" shown in FIG. 2B, the downward movement of the cutting blades from the cutting position (C) occur in the vertical direction. In an example of the track "T2" shown in FIG. 2C, the movement tracks of the cutting blades are of rectangular shape consisting of horizontal forward and backward movements and vertical upward and downward movement.

A cutting apparatus, which effectively performs the above mentioned cutting method, will be discussed below referring to the drawings, FIGS. 3 and 4. As described in claim 2, a glass material cutting apparatus for cutting a glass material 20 discharged from a glass material reservoir 10 into a glass gob of a predetermined size by left and right cutting blades 91, 92 opposed to each other, comprising a horizontal movement mechanism (H) for translating said cutting blades close to or away from each other in a horizontal direction, and an upward and downward movement mechanism (V) for moving said horizontal movement mechanism in an upward and downward direction, said cutting blades 91, 92 being moved in a forward direction from respective stand-by positions P, P1 and in a downward direction (S1) to cut the glass material (C), and thereafter, in a further downward direction (S2) and in a backward direction, and thereafter, in an upward direction to return back to said stand-by positions (S3).

In the embodiment, as described in claim 3, a glass material cutting apparatus has a single driving portion 52 which drives said horizontal movement mechanism H and said upward and downward movement mechanism V. Therefore, the cutting apparatus becomes effective and efficiently.

Furthermore, according to the invention described in claim 4, the cutting apparatus which is driven by the single driving portion 52 described in claim 3 has the driving portion 52, left and right operating members 55 and 56, left and right cam member 61 and 62, and an elevator member 70, left and right supporting member 81 and 82, and left and right cutting blades 91 and 92.

The driving portion 52, as can be seen in FIG. 3, has a single drive motor 52A mounted on a base plate 51 which constitutes a stationary portion and a drive gear 53 connected to a rotor shaft 52B of the drive motor 52A. A conventional servo motor is preferably used for the drive motor 52A.

As shown in FIG. 4, the operating members 55 and 56 are comprised of gears which are engaged with and rotated by the drive gear 53 of the driving portion 52, and are juxtaposed symmetrically with respect to the drive gear 53. Numerals 55A and 56A in the drawings designate the rotor shafts of the operating members 55 and 56. Numerals 55B and 56B are bearings for the rotor shafts 55A and 56A, which are mounted on the base plate 51.

The cam members 61 and 62 are made of plates having a cam profile as shown in FIG. 4 and are connected to the rotor shafts 55A and 56A of the operating members 55 and 56, respectively, so as to rotate together with the operating members 55 and 56. The cam members 61, 62 are provided with first cam portions 65, 66 and second cam portions 67, 68, respectively. In the illustrated embodiment, the outer peripheral surface portions of the cam members 61, 62 define the first cam portions 65, 66 and a freely rotatable members provided on the surface of the plates of the cam members 61, 62 define the second cam portions 67, 68. The second cam portions 67, 68 extend through the openings of the elevator member 70 which will be discuss hereinafter and to a side thereof opposite to the driving portion 52. As a matter of course, the first cam portions 65, 66 and the second cam portions 67, 68 are arranged so as to engage with corresponding engagement portion which will be discussed below, in order to carry out in a predetermined movement (along the movement tracks mentioned above).

The elevator member 70, as shown in the drawings, is in the form of a frame and is provided with first engagement portions 71, 72 which are engaged by the first cam portions 65,66 of the left and right cam portions 61, 62, respectively. In this embodiment, as particularly understood from FIG. 4, the first engagement portions 71, 72 are formed by freely rotatable members provided on the upper portion of the rear surface (adjacent to the driving portion 52) of the frame member of the elevator member 70. The first engagement portions 71, 72 are engaged with the first cam portions 65, 66 of the cam members 61, 62, so that vertical sliders 75, 76 of the elevator member 70 are moved along vertical rails 59 provided on the base plate 51 in accordance with the rotation of the cam members 61, 62, whereby the elevator member 70 can be moved in upward and downward directions as indicated by arrows Y—Y in FIG. 4. Thus, the rotation of the first cam members 65, 66 is converted into the linear movement in the upward and downward directions by the first engagement portions 71, 72. The elevator member 70, etc., constitute the upward and downward movement mechanism V.

Left and right supporting members 81, 82 are generally of an inverted-L shape in a side view and are, as shown in FIG. 4, comprised of elongated body members 81A, 82A and arm portions 81B, 82B which extend from the body members 81A, 82A in the horizontal direction away from driving portion 52. The left and right supporting members 81, 82 have second engagement portions 83, 84 which are engaged with the second cam members 67, 68 of the cam members 61, 62, on the rear surface portion (adjacent to the driving portion 52) of the body members 81A, 82A. In this embodiment, the second engagement portions 83, 84 is, as shown in FIG. 4, are comprised of groove portions 83a, 84a extending upward and downward with which the second cam portion 67, 68 comprised of the rotors, which are free to rotate, are slidably in contact. According to the rotation of the cam members 61, 62, the second cam portions 67, 68 are moved up and down while being in sliding contact with the second engagement portions 83, 84 comprised of the groove portions 83a, 84a. Consequently, horizontal sliders 85, 86, 87, 88 provided on the left and right supporting members 81, 82 are slidably moved along lateral rails 77, 77 on the elevator member 70. As a result, the left and right supporting members 81, 82 are moved in the lateral direction indicated by arrows X—X in FIG. 4 to come close to or away from each other. Namely, the rotation of the second cam portions 67, 68 is converted into the lateral movement by the second engagement portions 83, 84 comprised of the groove portions 83a, 84a. The components above constitute a lateral movement mechanism H. It goes without saying that the second cam portions 67, 68 and the second engagement portions 83, 84 are arranged so that the left and right supporting members 81, 82 are moved close to or away from each other.

The cutting blades 91, 92 are mounted to the arm portions 81B, 82B of the supporting members 81, 82, respectively, so that they are opposed to each other. Conventional cutting blades can be used for the cutting blades 91, 92. In the illustrated embodiment, plural sets of opposed cutting blades 91, 92 (four sets) are provided but, a single set of cutting blades can be used.

The operation of a glass material cutting apparatus shown in the drawings will be discussed below. When the drive gear 53 is rotated by the drive motor 52A of the driving portion 52 mounted on the base plate 51, the left and right operating members 55, 56 which are engaged with the drive gears 53 are rotated as indicated by the arrows in FIG. 4. The left and right cam members 61, 62 are rotated together in accordance with the rotations of the left and right operating members 55, 56. The first cam portions 65, 66 and the second cam portions 67, 68 are rotated in accordance with the rotation of the cam members 55, 56.

The first cam members 65, 66 are engaged with the first engagement portions 71, 72 of the elevator member 70 so that vertical sliders 75, 76 of the elevator member 70 are moved in the upward and downward directions along the vertical rails 59 on the base plate 51. The second cam portions 67, 68 are engaged with the second engagement portions 83, 84 of the left and right supporting members 81, 82, so that the lateral sliders 85, 86 on the left and right supporting members 81, 82 are moved in the lateral direction to come close to and away from each other, along the lateral rails 77 formed on the elevator member 70.

Thus, the opposed cutting blades 91, 92 provided on the arm portions 81B, 82B of the supporting members 81, 82 are moved, with regard to the glass material 20, as mentioned above with the reference of FIG. 1, forward from the stand-by positions (retracted positions) P, P1 and downward (S1), to cut the glass material 20 (C). Thereafter, they are further moved downward and backward (S2), and are thereafter, moved upward to return back to the stand-by position P, P1 (S3).

According to the invention, there is provided a method for cutting a glass material wherein the glass material can be certainly cut a glass gob having a uniform quality and a uniform temperature distribution, without being deformed or damaged. Furthermore, a cutting apparatus of the present invention has high durability in which a glass material can be cut at high-speed and economically.

According to the invention described in claim 1, there is provided a method for cutting a glass material, discharged from a glass material reservoir into a glass gob of a predetermined size, using left and right cutting blades which are moved close to and away from each other in a horizontal direction, wherein said cutting blades are opposed to the other and are translated in such a way that the movement occurs in a forward direction from stand-by positions and in a downward direction to cut the glass material, and thereafter, in a further downward direction and in a rearward direction, and thereafter, in an upward direction to return back to said stand-by positions, and therefore, even for a glass material in the high temperature and the low viscosity, glass gob does not ride on the upper surfaces of the cutting blades, and glass gob having a uniform quality, a uniform shape and a uniform temperature distribution can be obtained.

According to the invention described in claim 2, there is provided a glass material cutting apparatus for cutting a glass material discharged from a glass material reservoir into a glass gob of a predetermined size by left and right cutting blades opposed to each other, comprising a horizontal movement mechanism (H) for translating said cutting blades close to or away from each other in a horizontal direction, and an upward and downward movement mechanism (V) for moving said horizontal movement mechanism in an upward and downward direction, said cutting blades being moved in a forward direction from respective stand-by positions and in a downward direction to cut the glass material, and thereafter, in a further downward direction and in a backward direction, and thereafter, in an upward direction to return back to said stand-by positions. Therefore, said cutting method can be conducted easily and certainly.

According to the invention described in claim 3, there is provided a glass material cutting apparatus according to claim 2, wherein said horizontal movement mechanism and said upward and downward movement mechanism are driven by a single driving portion. Therefore, the cutting apparatus becomes effective and efficiently.

According to the invention described in claim 4, there is provided a glass material cutting apparatus comprising a single driving portion mounted on a base plate, left and right operating members which are rotatable by said driving portion, left and right cam members which are rotatable together with said operating members and which have first cam portions and second cam portions, respectively, an elevator member which has first engagement portions which are engaged with the first cam portions of said cam members and which are moved up and down along a vertical rail provided on said base plate, in accordance with a rotation of said cam members, left and right supporting members which have second engagement portions which are engaged with the second cam portions of said cam members and which are moved laterally close to or away from each other along a lateral rail provided on said elevator member, in accordance with a rotation of said cam members, and left and right cutting blades which are provided on said supporting members and are opposed to each other. Therefore, a cutting apparatus has high durability in which a glass material can be cut at high-speed and economically.

What is claimed is:

1. A glass material cutting apparatus for cutting a glass material discharged from a glass material reservoir into a glass gob of a predetermined size by left and right cutting blades opposed to each other, comprising:

a horizontal movement mechanism for translating said cutting blades close to or away from each other in a horizontal direction, an upward and downward movement mechanism for moving said horizontal movement mechanism in an upward and downward direction, said cutting blades being moved about a movement track in a forward direction from respective stand-by positions and in a downward direction to cut the glass material, and thereafter, in a further downward direction and in a backward direction, and thereafter, in an upward direction to return back to said stand-by positions, the movement track having a non-circular configuration, a single driving portion mounted on a base plate, left and right operating members which are rotatable by said driving portion, left and right cam members which are rotatable together with said operating members and which have first cam portions and second cam portions, respectively, an elevator member which has first engagement portions which are engaged with the first cam portions of said cam members and which are moved up and down along a vertical rail provided on said base plate, in accordance with a rotation of said cam members, left and right supporting members which have second engagement portions which are engaged with the second cam portions of said cam members and which are moved laterally close to or away from each other along a lateral rail provided on said elevator member, in accordance with a rotation of said cam members, and left and right cutting blades which are provided on said supporting members and are opposed to each other, wherein said horizontal movement mechanism and said upward and downward movement mechanism are driven by the single driving portion.

\* \* \* \* \*